July 4, 1950     H. N. SOPER     2,514,264
BRAKE OF THE TORSION SPRING AND DRUM TYPE
Filed Nov. 14, 1946
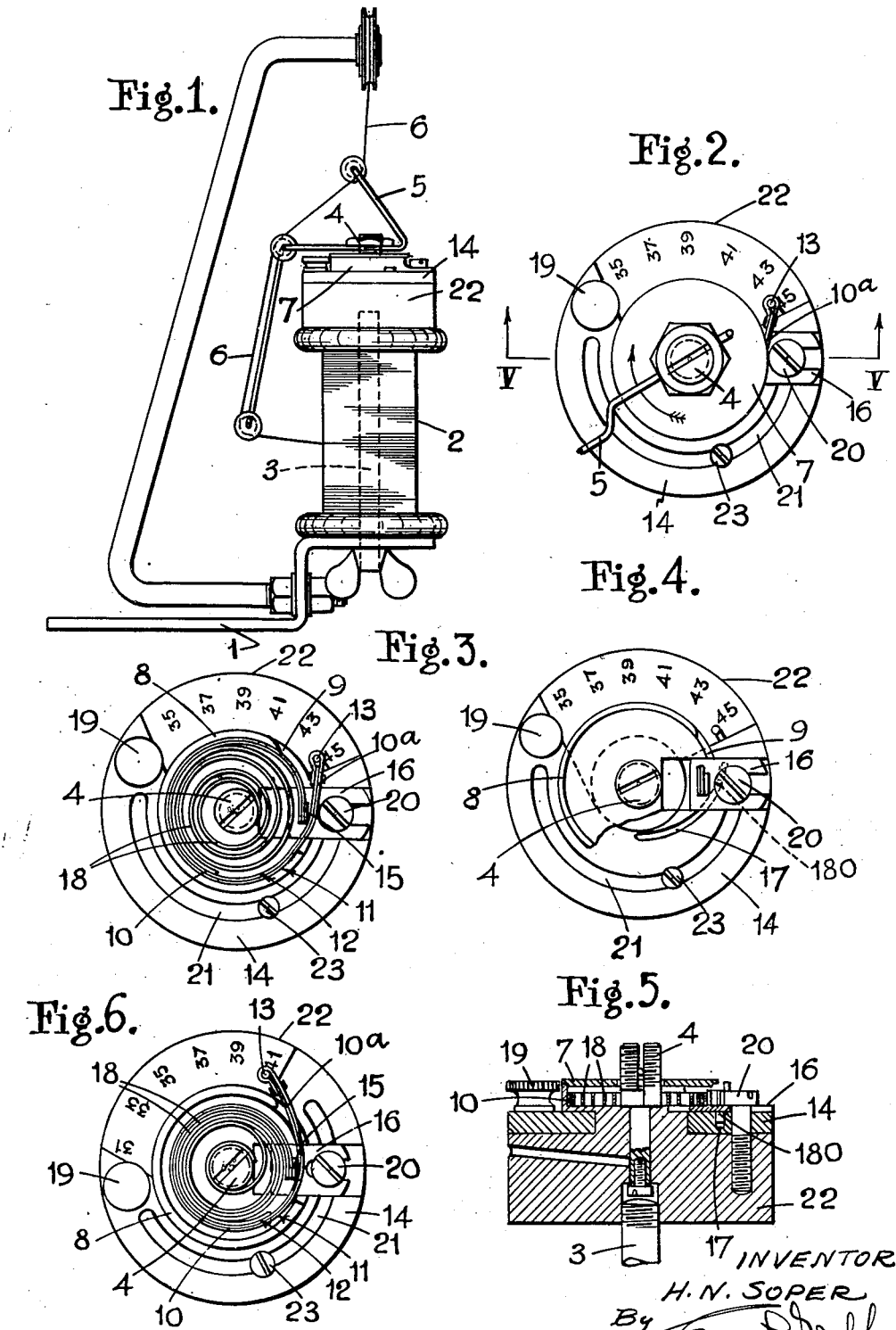
INVENTOR
H. N. SOPER

UNITED STATES PATENT OFFICE 2,514,264

BRAKE OF THE TORSION SPRING AND DRUM TYPE

Horace Nettleship Soper, London, England

Application November 14, 1946, Serial No. 709,830
In Great Britain September 24, 1945

Section 1, Public Law 690, August 8, 1946
Patent expires September 24, 1965

10 Claims. (Cl. 188—83)

This invention refers to brakes of the type wherein a flat spiral spring anchored by its inner end to a central spindle or shaft coacts by its outer end with an enclosing drum so that a braking effort is imposed by the torsion of the spring and its frictional contact with the drum when there is relative movement between the spindle and the drum. Most frequently it is the spindle which revolves in a fixed drum, and an example of this may be seen in brakes sometimes used in connection with paying-out mechanism associated with coil-winding devices, e. g. for paying-out wire, especially fine gauge wire as used in bobbins employed for electrical and wireless apparatus.

In the said type of brakes, as applied to paying-out mechanism of the foregoing character the rotatory spindle carries a flyer or guide arm over which the paid-out wire is guided from a stationary feed spool held co-axially with the spindle, and as tension is applied to the wire to draw it off the bobbin the flyer and spindle rapidly rotate so as to unwind the wire from the bobbin. The aforesaid flat spiral spring exercises its maximum braking effort when the tension is relaxed and the parts are at a standstill. Thus on relaxing tension the forward movement of the flyer is arrested automatically and also, on starting up, the inertia and frictional grip of the rotating parts is overcome gradually as the flyer gains momentum, the spring being gradually put under torsion and progressively easing the braking pressure of the spring against the drum. These brakes also avoid slack and maintain a tension during varying speeds and also at the conclusion of a paying-out run by providing automatically for a recoil or slight reverse turning force on the spindle.

It will be appreciated that for every gauge of wire there is a corresponding strength of maximum brake effort and it has previously been proposed to change the spring according to the gauge of wire. Heavier springs or springs with more convolutions would be substituted for lighter springs when a heavier gauge of wire is to be pair out by the apparatus.

It is an object of the present invention to provide a brake of the type above specified, that is, a brake of torsion spring and drum type, in which the need to interchange springs to produce different braking efforts is avoided.

Another object of this invention is to provide a brake of the type specified, in which provision is made for varying the maximum braking effort by effecting a simple mechanical adjustment.

A further object of this invention is to provide a brake of the type specified, in which provision is made for adjusting the effective diameter of an element serving in the capacity of a brake drum.

A still further object of the invention is to provide a brake of the type specified which is particularly adapted to adjusting the frictional restraint imposed on the flyer of the paying-out mechanism of a coil winding machine, so that a sngle torsion spring can be used for braking a flyer dealing with wire of different gauges.

In order that the invention may be clearly understood and readily carried into effect, reference will now be made to the accompanying sheet of drawings which illustrates, by way of example, one of a variety of ways in which the invention may be carried into effect. On the drawings:

Figure 1 is a side elevation of the invention applied to paying-out mechanism associated with coil-winding devices;

Figure 2 is a plan view of the mechanism provided by this invention;

Figure 3 is a view similar to Figure 2 but with the lid of the brake housing removed to expose the interior thereof, Figure 4 is a view similar to Figure 3, but with the brake element removed and a part of the base of the brake housing broken away to show the eccentric groove in the arcuate slider;

Figure 5 is a section taken on the line V—V of Figure 2;

Figure 6 is a view similar to Figure 3, but showing the parts adjusted to lessen the effective diameter of the braking strip (as described later).

Referring to the drawings, Figure 1 illustrates the invention applied to paying-out mechanism associated with coil-winding devices and in which there is provided a bracket 1 for supporting a stationary feed-spool 2 mounted on a guide rod 3. Disposed co-axially with the spool 2 is a rotary spindle 4 carrying a flyer or guide arm 5 over which the paid out wire 6 passes as tension is applied to the wire to draw it off the spool 2, the spindle 4 and flyer 5 rotating rapidly so as to unwind the wire from the spool.

The brake housing 7 is formed with a rigid wall 8 as usual and part of this is broken away as at 9 so that a springy flexible braking strip 10 can be housed in the housing 7 and led out of the space 9 formed in the wall 8. This springy braking strip 10 may be advantageously a length of springy steel 11 over which is superimposed a strip of fibre 12 (see Figures 3 and 6). One end of the strip 10 is anchored at 13 to an arcuate slider 14 mounted on the outside of the housing 7 and the other end is mounted at 15 on a radial slider which can move radially in a slot in the base of the housing 7 and so move to and fro in relation to the axis of the housing 7. The said arcuate slider 14 is formed with an eccentric groove or runway 17 (see Figure 4) which is engaged by a tongue or equivalent 180, (Figures 4 and 5) on the radial slider 16. By this arrangement, when moving the arcuate slider 14 concentrically around the housing 7, the said radial slider 16 will be caused to move inwardly or outwardly according to the direction of movement of the arcuate slider 14. The result of this is that one end 10a of the braking strip 10 may be carried around the exterior of the housing 7 concentrically, thus tightening or loosening the strip 10 where it is wound with a single convolution inside the housing 7, and at the same time the other end of the strip which is anchored at 15 to the radial slider 16 is moved inwardly or outwardly.

Figure 6 shows the inward adjustment of the anchorage 15, the arrangement being such that when the strip 10 is tightened by the arcuate slider 14, the inner end of the strip which is anchored at 15 to the radial slider 16 is moved towards the centre of the housing 7. It will be seen, therefore, that by this arrangement the braking strip 10 which virtually constitutes a brake drum is in the form of a single convolution, the effective diameter of which may be increased or decreased. The usual spiral spring 18 attached to the flying spindle 4 which projects into the centre of the housing 7 operates against such an adjustable braking strip 10.

Any suitable clamping means may be employed to lock the arcuate slider 14 in any particular position of adjustment and to control its arcuate movement over the top of a base member 25. In the illustrated embodiment a screw 19 is engaged in a tapped hole in the slider 14 and is adapted to be turned so that the point of the screw 19 presses down on to the top of the base member 22 and lifts the slider 14 very slightly into binding contact with the underside of the overhanging peripheral portion of the housing 7. The arcuate movement of the slider 14 is controlled by a screw 20 which passes freely through an arcuate slot 21 in the arcuate slider and is threaded at its lower end into a base member 22. The screw 20 also acts as a guide for the radial slider 16 which is forked at its outer end so as to embrace said screw 20. A stop 23 may be provided for limiting the movement of the arcuate slider 14. The arcuate slider may be associated either by an arrow mark thereon, or by one of its edges with a scale on the upper face of the base 22, and the scale may have graduations of any suitable kind. For example, graduations marked with the numbers of various gauges of wire could be employed so that in use, the arcuate slider 14 would be turned to register with any particular gauge number. Or a series of consecutive position numbers 1, 2, 3 and so on, or letters A, B, C, and so on, or descriptive legends such as "Very fine," "Fine," "Normal," "Thick," "Very thick," or the like, may be marked against the graduations, according to the particular use to which the device is to be applied.

By reducing the effective diameter of the brake strip 10 the torsion spring 18 can be made to operate in a more restricted space than when the brake strip 10 is adjusted to its largest dimension. When the braking strip 10 is opened out to its largest dimension the torsion spring 18 exercises its lightest braking effort and the device is thereby adapted for a light gauge wire, but when the braking strip 10 is constricted the convolutions of the torsion spring 18 are initially closed together and the torsion increased, the device being thus adapted for use with wire of heavier gauge.

I claim:

1. A brake of the type specified comprising two relatively rotatable elements, one element being a spindle and the other element being a housing encircling said spindle, a torsion spring lying within said housing and anchored to said spindle and a contractibly and expansibly adjustable brake band interposed between the torsion spring and the encircling housing to impose a frictional drag on said torsion spring and attached by opposite ends to mounting means which are arcuately adjustable around said spindle and said housing for the purpose of varying the effective diameter of the brake band.

2. A brake of the type specified comprising a non-rotatable base, a housing fixed on said base, a spindle rotatably mounted on said base within said housing, a torsion spring anchored by one end to said spindle for rotation therewith, a brake band encompassing and in frictional contact with the torsion spring and fixable in relation to said base, and means for adjusting said brake band diametrically to effect alteration in the degree of frictional restraint imposed by said brake band on said rotating spring and the associated spindle.

3. A brake as claimed in claim 2, wherein the means for effecting diametral adjustment of the brake band comprises an arcuate slider mounted on said base for movement concentrically around the spindle and housing and a radial slider mounted on said arcuate slider, the brake band having its opposite ends attached to the arcuate slider and the brake band respectively and said arcuate slider and said radial slider being interconnected so that adjusting movement imparted to the arcuate slider is accompanied simultaneously by appropriate complementary movement of the radial slider.

4. A brake of the type specified, comprising a non-rotatable housing; a spindle rotatably mounted in said housing; a brake element lying within but separate from said housing; a torsion spring within said brake element, anchored by its inner end to said spindle and in frictional contact by its outer surface with said encircling brake element, and means associated with said brake element for varying its effective diameter thereby to adjust the braking effort of said torsion spring.

5. A brake according to claim 4, wherein the brake element diameter-varying means comprises a first slider movable arcuately relative to the housing, to which arcuate slider one end of the brake element is connected, and a second slider movable radially relative to the housing, to which radial slider the other end of the brake element is connected.

6. A brake according to claim 5, wherein the housing is formed with an opening in its wall through which one end of the brake element is led to be anchored to said arcuate slider which is mounted on the outside of the housing for angular adjustment in relation to said housing.

7. A brake according to claim 5, wherein the arcuate slider is formed with an eccentric runway which is engaged by a projection on the radial slider, the arrangement being such that by moving the arcuate slider concentrically around the spindle the radial slider is caused to move radially in a direction depending on the direction of movement of the arcuate slider.

8. A brake according to claim 5, wherein means are provided for guiding the arcuate slider and the radial slider and also for locking the arcuate slider in any position of adjustment.

9. A brake according to claim 4, wherein the braking element comprises a springy strip consisting of a single convolution within which is disposed a multi-convolution spiral torsion spring.

10. A brake according to claim 9, wherein the springy strip is made of spring steel which is faced with a strip of fibre on the side thereof which contacts with the outer convolution of the torsion spring.

HORACE NETTLESHIP SOPER.

REFERENCES CITED

The following references are of record in the file of this patent:

UNITED STATES PATENTS

| Number | Name | Date |
| --- | --- | --- |
| 223,133 | Hall | Dec. 30, 1879 |
| 434,537 | Ware et al. | Aug. 19, 1890 |
| 590,533 | Tarbox | Sept. 21, 1897 |
| 1,158,406 | Pierce | Oct. 26, 1915 |
| 1,414,996 | Parker | May 2, 1922 |
| 1,487,853 | Handley | Mar. 25, 1924 |
| 1,708,344 | Winkler | Apr. 9, 1929 |
| 1,997,727 | Greve | Apr. 16, 1935 |